US006834324B1

(12) United States Patent
 Wood (10) Patent No.: US 6,834,324 B1
(45) Date of Patent: Dec. 21, 2004

(54) SYSTEM AND METHOD FOR VIRTUAL TAPE VOLUMES

(75) Inventor: Robert Barry Wood, Niwot, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/546,312

(22) Filed: Apr. 10, 2000

(51) Int. Cl.[7] .............................................. G06F 12/00

(52) U.S. Cl. ........................... 711/111; 711/4; 711/203; 710/305

(58) Field of Search ....................... 711/111, 112, 113, 711/114, 203, 202, 162, 4, 154, 170, 200, 201; 709/252; 710/305, 252; 712/207; 707/1

(56) References Cited

U.S. PATENT DOCUMENTS

| 3,130,387 A | 4/1964 | Wright et al. |
| 3,292,153 A | 12/1966 | Barton et al. |

(List continued on next page.)

FOREIGN PATENT DOCUMENTS

| CA | 892798 | 2/1972 | |
| EP | 0 887 751 A2 * | 6/1998 | ........... G06F/17/30 |
| GB | 1167762 | 10/1969 | |
| GB | 1353770 | 5/1974 | |
| GB | 1359662 | 7/1974 | |
| GB | 1496779 | 1/1978 | |
| GB | 1547381 | 6/1979 | |
| GB | 2 063 532 B | 6/1981 | |
| JP | 51-18409 | 2/1976 | |
| JP | 52-106641 | 9/1977 | |
| JP | 53-022331 | 3/1978 | |
| JP | 53-84632 | 7/1978 | |
| JP | 53-98741 | 8/1978 | |
| JP | 53-108747 | 9/1978 | |
| JP | 55-153058 | 11/1980 | |
| JP | 55-164958 | 12/1980 | |
| JP | 4-48250 | 8/1992 | |
| JP | 07084839 A * | 3/1995 | ........... G06F/12/00 |
| WO | 99 06912 | 2/1999 | |
| WO | 00 04454 | 1/2000 | |

OTHER PUBLICATIONS

Plaintiffs' Notice Pursuant to 35 U.S.C. § 282, Sutmyn Storage Corp et al. v. Storage Technology Corp., Civil Action Nos. C97 20105 RMW (EAI) and C97 20629 RMW (EAI).

Protest Of Reissue Application Under 37 C.F.R. § 1.291, In re application of: application No. 08/934,732, filed: Sep. 22, 1977; For: Virtual Storage System and Method.

USPTO—In re application of application No.: 08/934,732, Filed: Sep. 22, 1997 For: Virtual Storage System and Method—Information Disclosure Statement and PTO Form 1449 accompanying Protest Of Reissue Application Under 37 C.F.R. § 1.291, dated Jul. 19, 1999.

Sutmyn Storage Corporation, et al. v. Storage Technology Corporation and Storage Technology Corporation v. Sutmyn Storage Distribution Co., C97–20105 RMW, C97 20629 RMW, Findings of Fact and Conclusion of Law, dated Mar. 18, 2003.

(List continued on next page.)

*Primary Examiner*—Pierre-Michel Bataille
(74) *Attorney, Agent, or Firm*—Brooks Kushman P.C.

(57) ABSTRACT

A system that emulates a tape cartridge mounted in a tape drive, and methods of operation are disclosed. The emulated tape drive communicates with a client using an interface protocol defining an addressable range. The emulated tape cartridge has a virtual addressable range that matches or exceeds the addressable range defined in the interface protocol. One or more storage appliances provide the emulation of the tape drive and a plurality of virtual volumes. An interface manager disposed between the client and the storage appliances mounts the virtual volumes as necessary to assemble the emulated tape cartridge.

13 Claims, 6 Drawing Sheets

U.S. PATENT DOCUMENTS

| | | |
|---|---|---|
| 3,699,533 A | 10/1972 | Hunter |
| 3,806,888 A | 4/1974 | Brickman et al. |
| 3,909,799 A | 9/1975 | Recks et al. |
| 3,928,857 A | 12/1975 | Carter et al. |
| 3,936,804 A | 2/1976 | Bachman |
| 3,949,377 A | 4/1976 | O'Neill, Jr. |
| 3,949,379 A | 4/1976 | Ball |
| 3,976,977 A | 8/1976 | Porter et al. |
| 4,021,782 A | 5/1977 | Hoerning |
| 4,035,778 A | 7/1977 | Ghanem |
| 4,040,026 A | 8/1977 | Gernelle |
| 4,054,951 A | 10/1977 | Jackson et al. |
| 4,077,059 A | 2/1978 | Cordi et al. |
| 4,080,651 A | 3/1978 | Cronshaw et al. |
| 4,080,652 A | 3/1978 | Cronshaw et al. |
| 4,084,228 A | 4/1978 | Dufond et al. |
| 4,084,234 A | 4/1978 | Calle et al. |
| 4,086,629 A | 4/1978 | Desyllas et al. |
| 4,091,455 A | 5/1978 | Woods et al. |
| 4,096,567 A | 6/1978 | Millard et al. |
| 4,110,823 A | 8/1978 | Cronshaw et al. |
| 4,123,795 A | 10/1978 | Dean, Jr. et al. |
| 4,126,894 A | 11/1978 | Cronshaw et al. |
| 4,158,235 A | 6/1979 | Call et al. |
| 4,189,770 A | 2/1980 | Gannon et al. |
| 4,215,400 A | 7/1980 | Denko |
| 4,228,501 A | 10/1980 | Frissell |
| 4,241,420 A | 12/1980 | Fish et al. |
| 4,246,637 A | 1/1981 | Brown et al. |
| 4,276,595 A | 6/1981 | Brereton et al. |
| 4,298,932 A | 11/1981 | Sams |
| 4,310,883 A | 1/1982 | Clifton et al. |
| 4,318,184 A | 3/1982 | Millett et al. |
| 4,327,408 A | 4/1982 | Frissell et al. |
| 4,412,285 A | 10/1983 | Neches et al. |
| 4,414,644 A | 11/1983 | Tayler |
| 4,467,421 A | 8/1984 | White |
| 4,533,995 A | 8/1985 | Christian et al. |
| 5,899,994 A * | 5/1999 | Mohamed et al. ............ 711/202 |
| 5,946,685 A * | 8/1999 | Cramer et al. ................. 707/10 |
| 6,029,179 A | 2/2000 | Kishi ........................... 707/202 |
| 6,070,224 A * | 5/2000 | LeCrone et al. ............. 711/112 |
| 6,260,110 B1 * | 7/2001 | LeCrone et al. ............. 711/112 |
| 6,289,425 B1 * | 9/2001 | Blendermann et al. ...... 711/170 |
| 6,324,497 B1 * | 11/2001 | Yates et al. ..................... 703/24 |
| 6,496,791 B1 * | 12/2002 | Yates et al. .................. 711/111 |
| 6,557,073 B1 * | 4/2003 | Fujiwara et al. ............. 711/111 |

OTHER PUBLICATIONS

Boggs, J.K. Jr., "Virtual Input/Output Channels for a Digital Computer," IBM Technical Disclosure Bulletin, vol. 20; No. 1, Jun. 1977, pp. 110–112. (Partial. All available information provided.).

Conti, C.J.; et all., "Structural aspects of the System/360 Model 85: General organization", IBM Systems Journal, vol. 7, No. 1, pp. 2–14, 1968. (Partial. All available information provided.).

IBM, "Reference manual for IBM 3830 Storage Control Model 1 and IBM 3330 Disk Storage", GA–26–1592–5, 6$^{th}$ Ed., Nov. 1976 ((c) 1971).

MASSTOR, Shell Oil Proposal, Dec. 18, 1978.

Nishimukai, T., et al. "Universal IQ Device Controller by Using Programmable Logic Arrays (PLA)", Conference Record, 11$^{th}$ Asilomar Conference on Circuits, Systems and Computers, Nov. 1977, pp. 477–480.

Porter, James N., "The Disk Drive Industry", IEEE Transaction on Magnetics, vol. MAG–14, No. 4, Jul. 1978, pp. 149–153.

Puthuff, Steven H., "Technical Innovations in Information Storage and Retrieval", IEEE Transactions on Magnetics, vol. MAG–14, No. 4, Jul. 1978, pp. 143–148.

Smith, Alan Jay, "Directions for Memory Hierarchies and their Components: Research and Development", 1978 IEEE, pp. 704–709.

Waddell, J.M., Way, D.L., "Channel Scheduling by a Control Unit", IBM Technical Disclosure Bulletin, vol. 17, No. 9, Feb. 1975, pp. 2553–2556.

Mass Storage Topics, BW000149–BW000226.

* cited by examiner

SYSTEM AND METHOD FOR VIRTUAL TAPE VOLUMES

TECHNICAL FIELD

The present invention is related to the field of virtual magnetic tape storage devices and method of operation.

BACKGROUND ART

In typical magnetic tape storage environments, many tape cartridges, tape drives, and library devices are distributed among various clients. These clients may be single user workstations, work groups, departmental servers, or large multi-user platforms. The management complexity of these environments increases as a function of how much data is stored and the heterogeneity of the computational environment. Storage management costs are a significant portion of the information technology budget, particularly in emerging markets, such as those known as open systems. Open systems shops are those that are based upon network operating systems such as UNIX, NT servers, and the like.

In open system markets, the primary use of magnetic tape technology has been concerning data security, particularly for data backup, restoration and disaster recovery. A combination of factors has hindered the adoption of magnetic tape for other applications. One of these factors is management complexity. While automated tape libraries and hierarchical storage tape systems provide a low-cost solution for storing vast amounts of data, they involve a reasonable amount of management complexity.

There has been a general tension between client needs and system management needs, especially in tape applications. For example, when library and tape device resources are centrally located, clients often need to contend with resource partitioning schemes that are by definition a sub-optimized utilization of resources. An example here is the need to maintain individual scratch tape pools for each partition. Alternatively, client usage of centralized resources may be scheduled with each client using a common pool of resources in turn. This is a challenge in environments characterized by growing information technology resource needs and periodic workloads, and aggravated by poor communications between centralized resources management and the clients. Virtual tape technology often makes the situation more challenging. For example, when a client wishes to backup a data set for export to another physical site, the mismatch between the multitude of virtual tape labels and their real counterparts can introduce errors in the recovery process.

Several technologies, such as virtual magnetic tape, storage area networking, and centralized systems management tools have evolved over the years to address data storage management challenges. Each of these technologies has addressed certain portions of the management problem. For example, virtual tape technology has enabled tape buffering and data transfer rate matching to achieve highly efficient utilization of the tape drives. Storage area networks have eliminated the bulk of the problems related to co-location of storage devices and clients, allowing open systems to centrally locate and manage storage resources. Finally, systems management tools have promised to provide common tools for data management in diverse environments.

Each of these technologies, however, solves only some problems. For example, virtual tape volumes are often designed to emulate real tape cartridges. From the client's point of view, there is no management advantage to use the virtual tape volumes over real tape cartridges. The client still must know on which virtual tape volume the desired data is stored, and the client must provide control of the storage appliance to mount and dismount the virtual tape volumes. In another example, system management tools tend not to provide uniform support for all data storage systems. Client provided management of a storage appliance provided from one vendor is usually incompatible is some respect with a second storage appliance provided from another vendor.

To improve client acceptance of magnetic tape as the preferred media for their applications, a tape storage system is required that is simple to use and is available at all times. Ideally, the tape storage system would appear to the client as one tape cartridge always mounted in a dedicated tape drive connected directly to the back of the client's computer, yet realize the benefits of centralized management. Capacity of this tape cartridge should be variable to meet the client's requirements and budget. The upper bound of the capacity should be virtually limitless for high end clients.

DISCLOSURE OF INVENTION

The present invention is a system that emulates a tape cartridge mounted in a tape drive, and a method of managing the system. Communication between the emulated tape drive and a client is performed using an interface protocol. An addressable range of the emulated tape cartridge matches or exceeds the addressable range defined in the interface protocol giving the tape cartridge the appearance of a practically limitless capacity. In operation, one or more storage appliances provide the emulation of the tape drive and multiple virtual tape volumes. An interface manager control mounting of the multiple virtual tape volumes in the tape drive so that they appear as one large tape cartridge to the client.

The interface manager includes an address map function that maps the interface protocol defined addresses into the various virtual addresses used by the multiple virtual tape volumes. In an alternative embodiment, address mapping can be used to preserve existing blocks of data by mapping new data to unused blocks elsewhere in the tape cartridge instead of overwriting the existing data. In a second alternative embodiment, the interface manager may include a protocol converter that translates between the interface protocol used to communicate with the client, and a second protocol used to communicate with the storage appliance. A third embodiment includes a policy controller that sets one or more performance parameters for the emulated tape drive or tape cartridge based upon the client's level of service.

Accordingly, it is an object of the present invention to provide a system and method that emulate a tape cartridge mounted in a tape drive, wherein a client communicates to the emulated tape drive through an interface protocol, and the tape cartridge's capacity matches or exceeds the addressable range defined by the interface protocol.

These and other objects, features and advantages will be readily apparent upon consideration of the following detailed description in conjunction with the accompanying drawings.

BEST MODE FOR CARRYING OUT THE INVENTION

Figure 1:
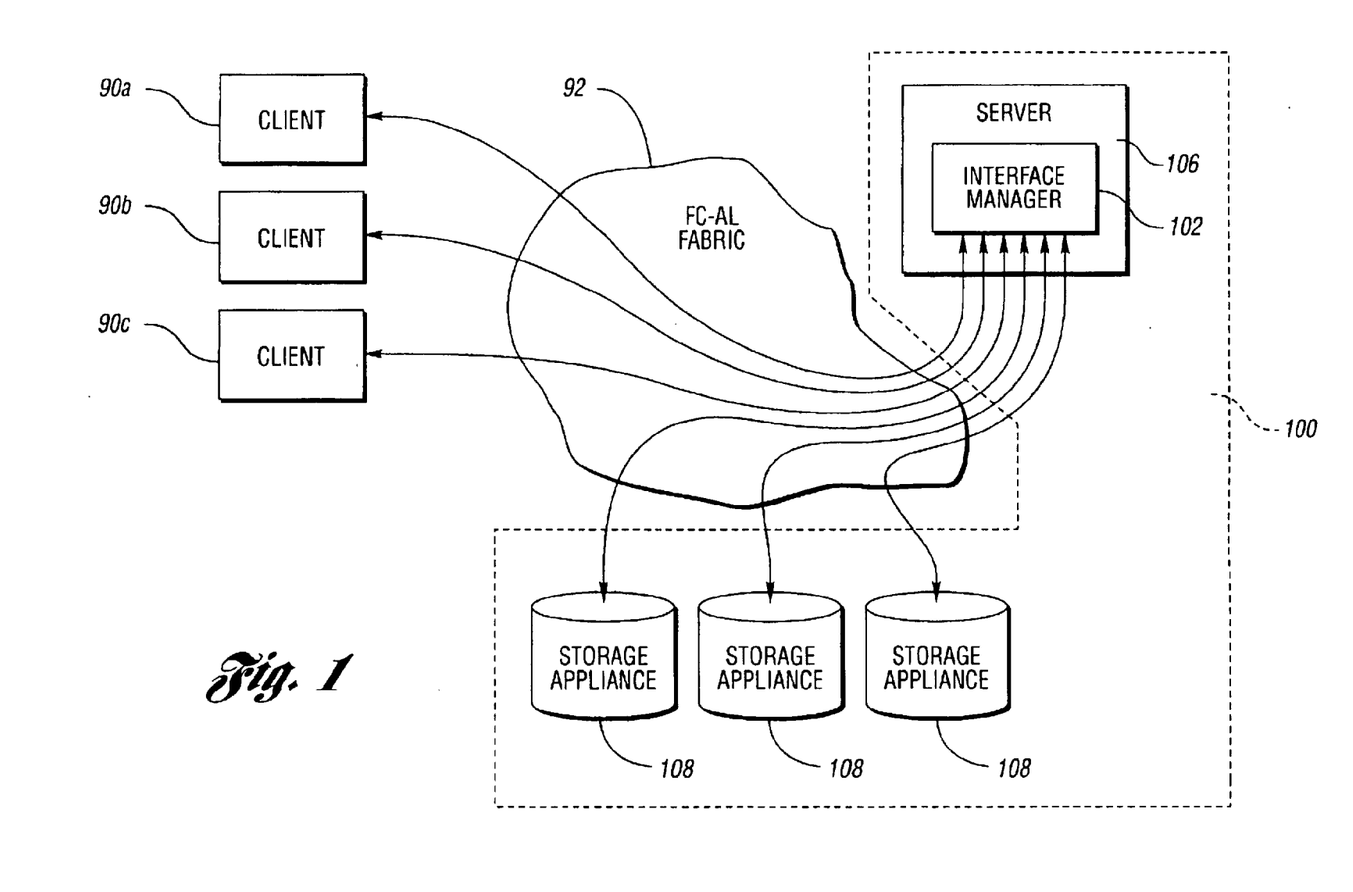
FIG. 1 is a block diagram of a system implementing the present invention connected to a client.
Figure 2:
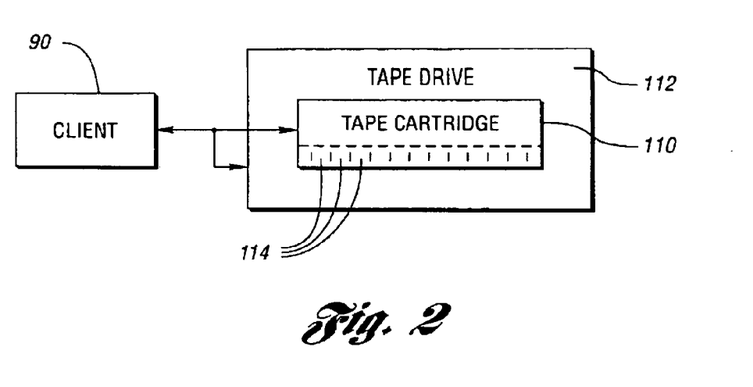
FIG. 2 is a block diagram of the present invention as seen from the client's point of view.

FIG. 1 is a block diagram of the present invention 100 connected to clients 90a–c. One or more clients 90a–c communicate with an interface manager 102 over a Fibre Channel-Arbitrated Loop (FC-AL) fabric 92. FC-AL fabric 92 is defined by the American National Standards Institute (ANSI) (New York, N.Y.) standard ANSI X3.272-1996. The interface manager 102 is hosted by a server 106 connected to the FC-AL fabric 92. Multiple storage appliances 108 are also in communication with the interface manager 102 via the FC-AL fabric 92. The interface manager 102 acts as a kind of gateway through which the clients 90a–ccommunicate with the storage appliances 108. The interface manager 102 also manages the storage appliances 108 and alters the communications so that from the client's point of view, the storage appliances 108 appear as one large emulated tape cartridge 110 mounted in an emulated tape drive 112 connected directly to each client 90, as shown in FIG. 2.

Various technologies may be used in the storage appliances 108. The technologies include, but are not limited to automated tape libraries, automated disk libraries, redundant and inexpensive device (RAID) systems, disk farms, and the like. What is necessary is that the storage appliances 108 can provide the emulated tape drive 112 and multiple virtual volumes 114 (shown in phantom). Here, emulation may be performed by using an actual tape drive as the emulated tape drive 112 and one or more actual tape cartridges as one or more of the virtual volumes 114. Physical location of the storage appliances 108 with respect to the server 106 is not important. All that is required is for a channel to be established through the FC-AL fabric 92 to the interface manager 102. This allows the storage appliances 108 to be located near their source of control and maintenance while the server 106 is located elsewhere, near the clients 90a–c for example.

Figure 3:
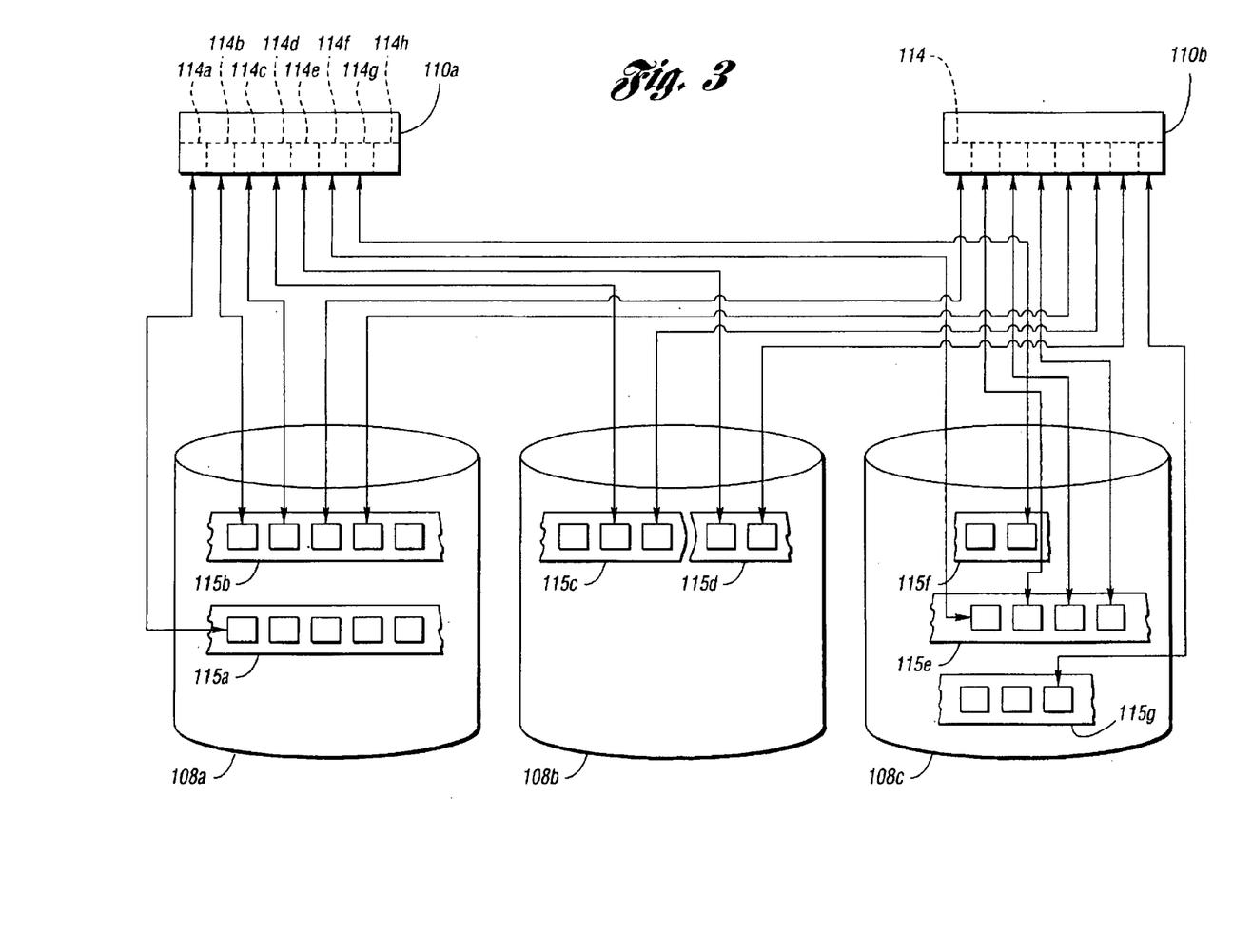
FIG. 3 is a block diagram showing a mapping of virtual volumes to real media within the storage appliances.

FIG. 3 shows an example of how the virtual volumes 114 of two emulated tape cartridges 110a–b are mapped into multiple storage appliances 108a–c. The first emulated tape cartridge 110a has eight virtual volumes 114a–h. First virtual volume 114a is physically located on a first real medium 115a within a first storage appliance 108a. Second and third virtual volumes 114b–c are physically located adjacent to each other on a second real medium 115b within the first storage appliance 108a. Likewise, a fourth and fifth virtual volumes 114d–e are physically located on third and fourth real media 115c and 115d respectively within a second storage appliance 108b. A sixth and seventh virtual volumes 114f–g are located on a fifth and sixth real media 115e–f respectively within a third storage appliance 108c. Finally, the eighth virtual volume 114h is located on the first real medium 115a within the first storage appliance 108a. In similar fashion, the various virtual volumes 114 that comprise the second emulated tape cartridge 110b are physically located on the various real media 115a–g within the storage appliances 108a–c.

Algorithms for mapping between virtual volume 114 order within the emulated tape cartridge 110 to the real media 115 within the storage appliances 108 may take many factors and policies into account. For example, mounting latency during data recall can be reduced if many sequential virtual volumes 114 of an emulated tape cartridge 110 are mapped to one real medium 115. Mounting latency during data writes can be reduces if the virtual volumes 114 are mapped to the first/best available real medium 115 in the first/best available storage appliance 108. Policy considerations may preclude storing data belonging to one client 90a on the same real media 115 as data belonging to a competitor client 90b. Disaster recovery requirements may dictate that mapping is made to real media 115 that is backed-up periodically to an offsite location, or redundantly written to multiple storage appliances 108 at different sites simultaneously. Historically significant data may require mapping the virtual volumes 114 to a write-once-read-many type real medium 115 to avoid accidental erasure, and so on.

Figure 4:
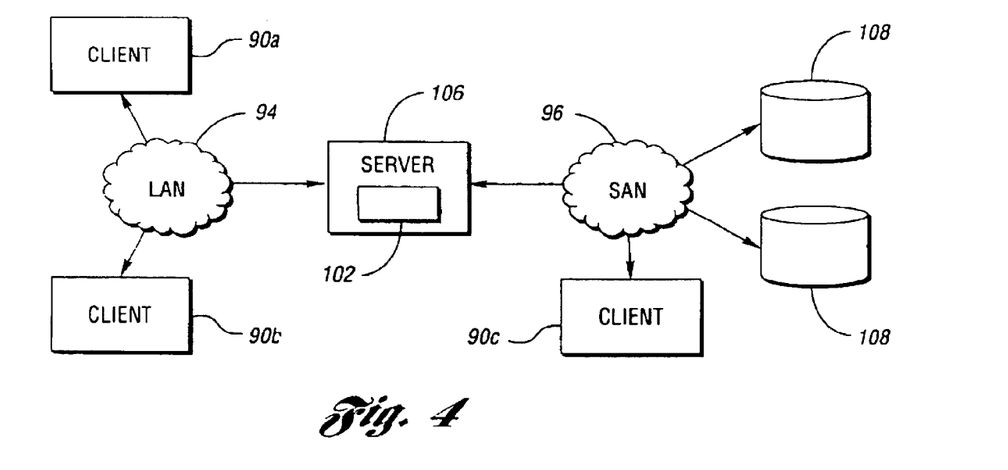
FIG. 4 is a block diagram of an alternative embodiment of a system that implements the present invention connected to the client.

The FC-AL fabric 92 is the preferred networking technology for the present invention. FC-AL fabric 92 allows "channels" to be established between the client 90 and the interface manager 102, and between the interface manager 102 and the storage appliances 108. Channels are special purpose communication links that can be established between nodes on the FC-AL fabric 92. Channels only require low level software and little overhead to transmit data across the FC-AL fabric 92. As a result, channels can provide high speed communications between the nodes. Other types of networks may be used in the present invention in place of the FC-AL fabric 92. For example, some clients 90a–b and server 106 may be connected on an Ethernet based local area network (LAN) 94 while the storage appliances 108 and another client 90c are part of a storage area network (SAN) 96 that is accessible to the server 106, as shown in FIG. 4. In other examples, the server 106 may connect to the storage appliances 108 through the Internet, a wide area network, an enterprise network, or any similar network technology.

Returning to FIG. 2, it is convenient when the apparent interface between the client 90 and the emulated tape drive 112 conforms to an industrial standard protocol. The preferred interface protocol is the Small Computer System Interface-2 (SCSI-2) standard. SCSI-2 is defined by ANSI standard ANSI X3.131-1994. This standard is commonly used in the computer industry for personal computers, workstations, servers, tape drives, disk drives, and other computational and storage devices. SCSI-2 is also one of the standard interface protocols that can be transparently encapsulated in an FC-AL frame and transported to another node in the AF-AL fabric. This capability allows the presence of the FC-AL fabric 92 to be transparent to the client 90. The client 90 only sees an emulated tape drive 112 with a mounted emulated tape cartridge 110 at one of the logical unit addresses on the SCSI-2 bus. In an alternative embodiment, the SCSI-2 protocol allows for eight logical units to be connected to the SCSI-2 bus. Since the client 90 usually occupies the last logical unit number, then up to seven emulated tape drives 112 with emulated tape cartridges 110 can be created simultaneously with the preferred embodiment of the present invention. This allows the client 90 to use the several emulated tape drives 112 and emulated tape cartridges 110 for different purposes. For example, one emulated tape drive 112 and emulated tape cartridge 110 may be allocated for sharing files within a workgroup. A second emulated tape drive 112 and emulated tape cartridge 110 may be used as a secure location for personal files. A third emulated tape drive 112 and emulated tape cartridge 110 may be used for nightly backups of a local server, and so on.

Another advantage of using the FC-AL fabric 92 to couple the interface manager 102 to the clients 90 and storage appliances 108 is that FC-AL fabric 92 supports transparent transportation of many different interface protocols. Beyond SCSI-2, FC-AL fabric 92 also supports Intelligent Peripheral Interface (IPI), High Performance Parallel Interface (HIPPI) Framing Protocol, Internet Protocol (IP), ATM Adaptation Layer for computer Data (AAL5), Link Encapsulation (FC-LE), Single Byte Command Code Set Mapping (SBCCS) and IEEE (Institute of Electrical and Electronics Engineers, Inc., Piscataway, N.J.) 802.2 protocols. Any of these standards may also be used in the present invention along with other similar industrial standards.

Figure 5:
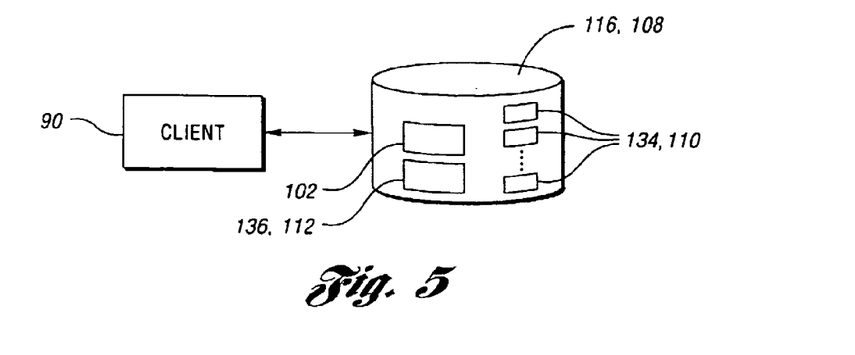
FIG. 5 is a block diagram of another alternative embodiment of a system that implements the present invention connected to the client.

Referring back to FIG. 1, the interface manager 102 is hosted by the server 106 connected to the FC-AL fabric 92 in the preferred embodiment. In alternative embodiments, the interface manager 102 may be hosted at other locations. One prime location would be to host the interface manager 102 within one storage appliance 108. Nearly all mass storage systems (storage appliances 108) have at least one computer providing management and control of the storage resources. One of these computers would provide a suitable host for the interface manager 102. Such an arrangement would allow a vendor to provide the present invention as a self-contained package. For example, a rack mounted automated tape library 116 (a type of storage appliance 108) containing thirty 35 gigabyte magnetic tape cartridges 134 (for the virtual volumes 114), a real tape drive 136 (for the emulated tape drive 112) and hosting the interface manager 102, as shown in FIG. 5, would appear to the client 90 as a single emulated tape cartridge 110 with a one terabyte capacity.

Another possible physical location for hosting the interface manager 102 is within the clients 90a–c. One advantage of this approach is that communications between the clients 90a–c and the interface manager 102 are no longer constrained by the speed limitations of the SCSI-2 standard or hardware. Still other possible hosts for the interface management software include LAN servers, proxy servers, firewall servers and similar gateways that allow the clients 90a–c to communicate outside the immediate network.

Figure 6:
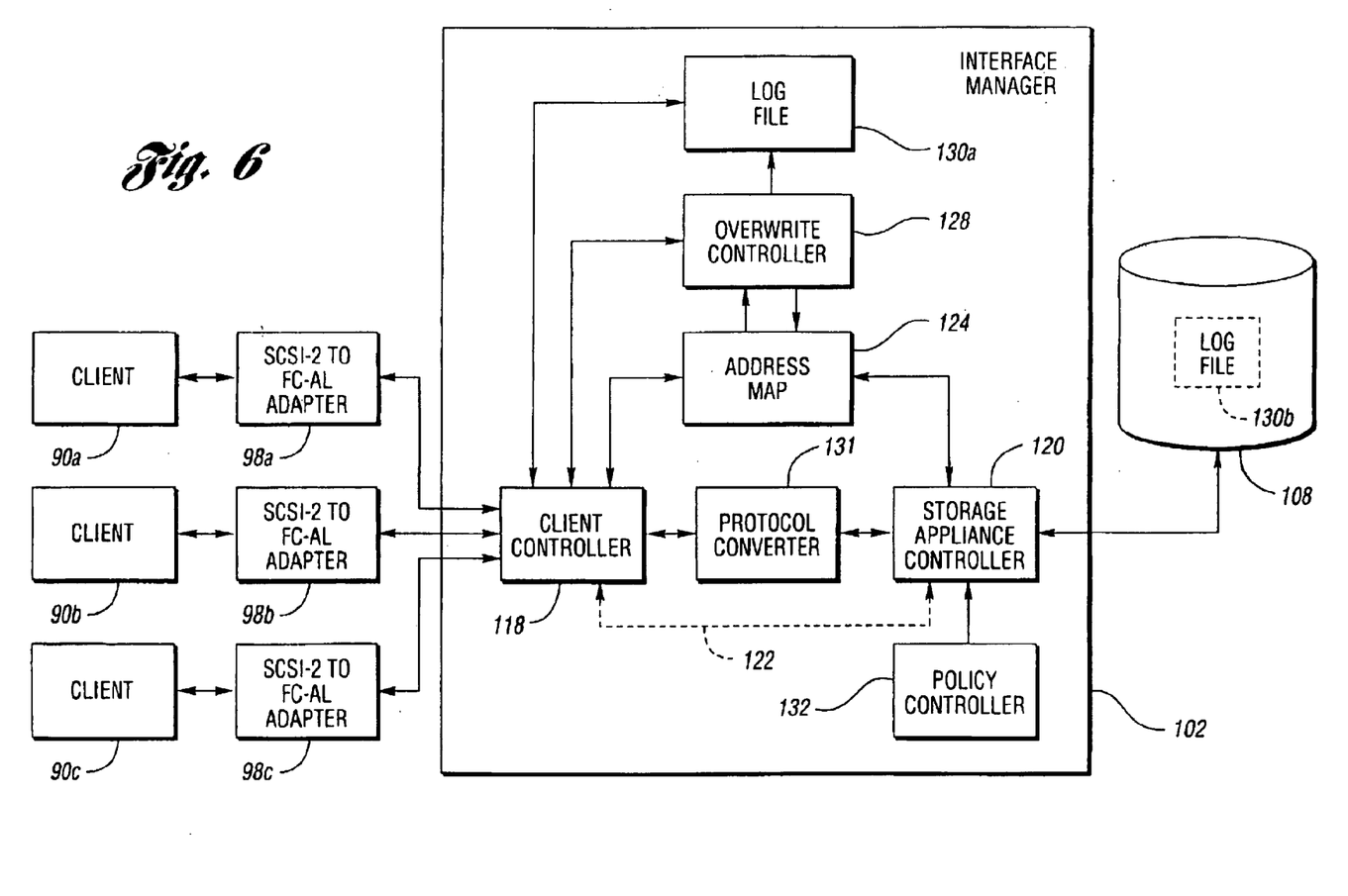
FIG. 6 is a functional flow block diagram of the preferred embodiment.

The interface manager 102 performs several functions. FIG. 6 is a functional flow block diagram of the system shown in FIG. 1. Communication with the clients 90a–c using the interface protocol is provided by a client controller 118. In the preferred embodiment, this means that the client controller 118 sends and receives messages from the clients 90a–c using the SCSI-2 standard. Several SCSI-2 to FC-AL adapters 98a–c are provided between the clients 90a–c and client controller 118 to account for insertion and removal of the SCSI message from the FC-AL fabric 92 at the client nodes.

A storage appliance controller 120 resides at the other end of the interface manager 102 to communicate with the storage appliances 108 (only one shown). The storage appliance controller 120 provides all of the initialization, mount, dismount, emulation, and various storage appliance specific control functions required by the storage appliances 108 to produce the emulated tape drives 112 and virtual volumes 114. The storage appliance controller 120 also has an ability to append the virtual volumes 114 together logically so that they appear as the emulated tape cartridge 110. When the storage appliance controller 120 is using the same interface protocol to communicate with the storage appliances 108 as the client controller 118 is using to communicate with the clients 90a–c, then the storage appliance controller 120 and the client controller 118 may transfer some non-addressing SCSI-2 messages directly between each other, as shown by the dotted line 122.

The SCSI-2 standard allows for a storage media to be divided as up into 256 partitions ($2^8$). Each partition can be formatted to a partition size of up to 65,536 ($2^{16}$) partition units, with each partition unit being currently selectable at up to one megabyte ($2^{20}$). (The SCSI-2 standard allocates two bits to define a partition size unit. Binary 10 is defined as a partition unit size of one megabyte. Binary 11 is unused in the standard.) This gives a maximum partition format size of approximately 68.8 gigabytes ($2^{36}$), and a total formatted media capacity of approximately 17.6 terabytes ($2^{44}$). Block addressing within partitions is provided by a 32-bit field, with a typical tape block being approximately 32 kilobytes ($2^{15}$) in size. This means that the addressable range within a partition may theoretically be as high as 140 terabytes ($2^{47}$), resulting in a wider address range than is currently used in a partition ($2^{36}$). By defining the unused binary 11 as a larger partition size unit, for example two gigabytes ($2^{31}$), then the formatted size of a partition can match the addressable range ($2^{47}$) within that partition.

Present day magnetic tape cartridges and their virtual counterparts have capacities of up to 35 gigabytes. This means that using the SCSI-2 standard, the present invention can provide the client 90 with an emulated tape cartridge 110 equivalent to four thousand virtual volumes 114/real tape cartridges at 35 gigabytes per virtual volume 114/real tape cartridge. An address map 124 function is provided in the interface manager 102 to map the 32-bit block addressing range of the SCSI-2 standard among the four thousand or more virtual volumes 114.

Figure 7:
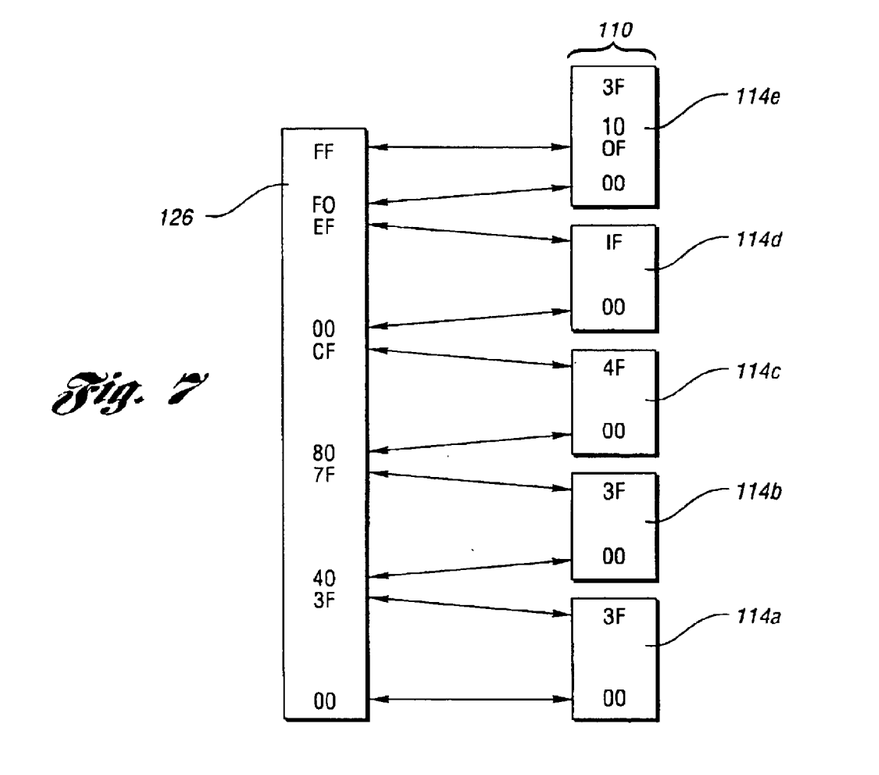
FIG. 7 is a schematic showing a mapping of an interface protocol address into virtual addresses.

FIG. 7 is a schematic of a mapping scheme where an 8 bit addressing space 126 is mapped into five virtual volumes 114a–e that are logically appended to form the emulated tape cartridge 110. In this example, the interface protocol defines addresses from 00 hex to FF hex. Virtual volumes 114a, 114b, and 114e each have virtual addresses ranging from 00 hex to 3F hex. Virtual volume 114c has a longer virtual address range spanning from 00 hex to 4F hex. Virtual volume 114d has a shorter virtual address range spanning from 00 hex to only 1F hex. (Had virtual volumes 114c and 114d been duplicates of virtual volumes 114a, 114b and 114e, then each address of the 8 bit interface protocol could be mapped into one virtual address of virtual volumes 114a–d. Virtual volume 114e would either have none of the 8 bit interface protocol addresses mapped to it, or virtual volume 114e would not even exist.)

Figure 8:
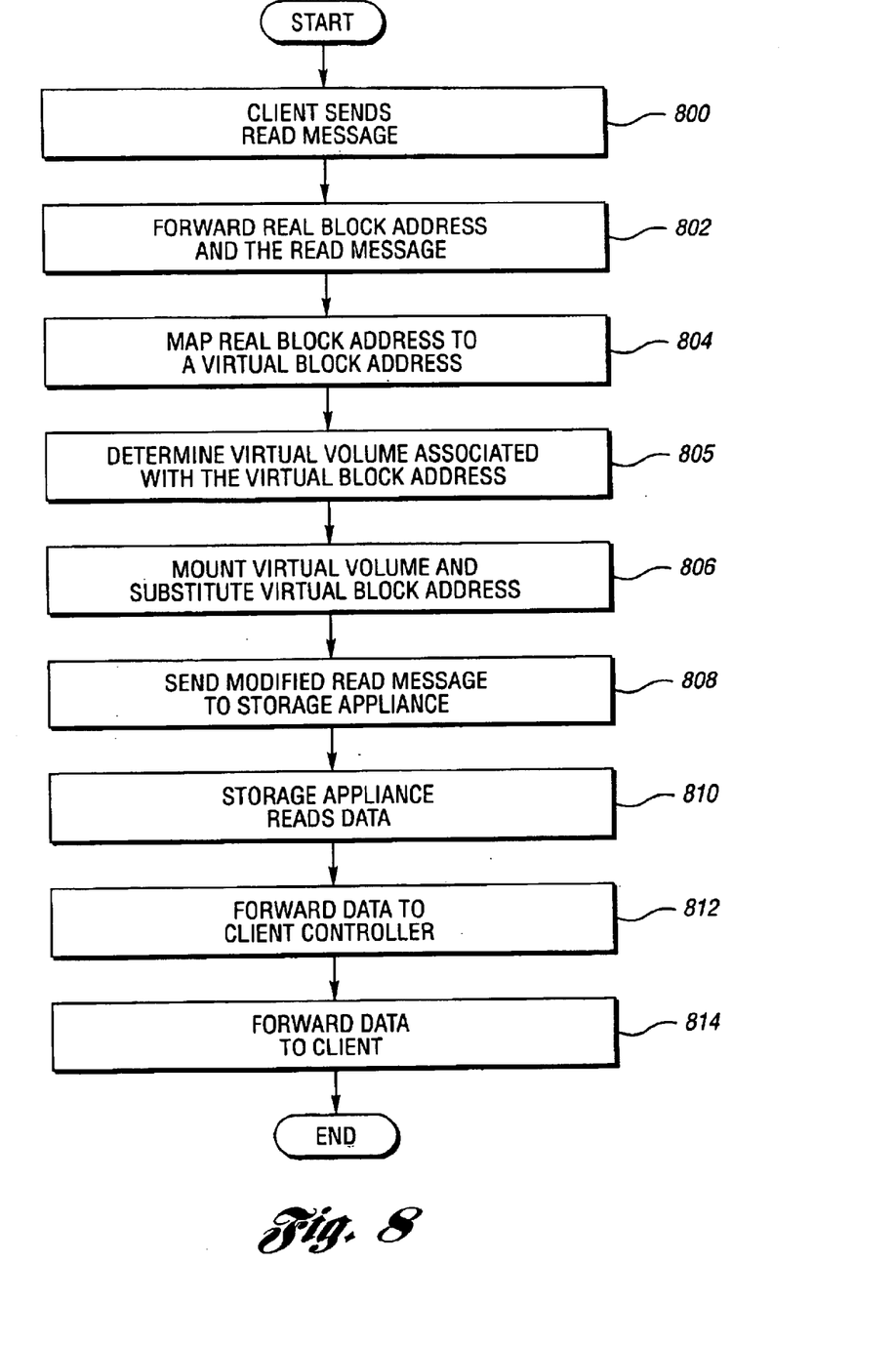
FIG. 8 is a flow diagram for a method of managing a read message from the client.

Referring to FIG. 8, a typical read message initiated by the client 90 contains a real block address, as shown in block 800. Upon receipt of the read message, the client controller 118 forwards the real block address to the address map 124, and the read message to the storage appliance controller 120, as shown in block 802. The address map 124 maps the real block address into a virtual block address, as shown in block 804. A specific virtual volume 114 associated with this virtual block address is then determined, as shown in block 805. Next, the storage appliance controller 120 sends a command to one storage appliance 108 to mount the specific virtual volume 114, if necessary, and substitutes the virtual tape address for the real block address in the read message, as shown in block 806. After the specific virtual volume 114 has been mounted, the storage appliance controller 120 forwards the read message having the virtual address to the storage appliance 108, as shown in block 808. The storage appliance 108 responds with data read from the specific virtual volume 114, as shown in block 810. Storage appliance controller 120 passes the data to the client controller 118, as shown in block 812. Finally, the client controller 118 passes the data back to the client 90, as shown in block 814.

Figure 9:
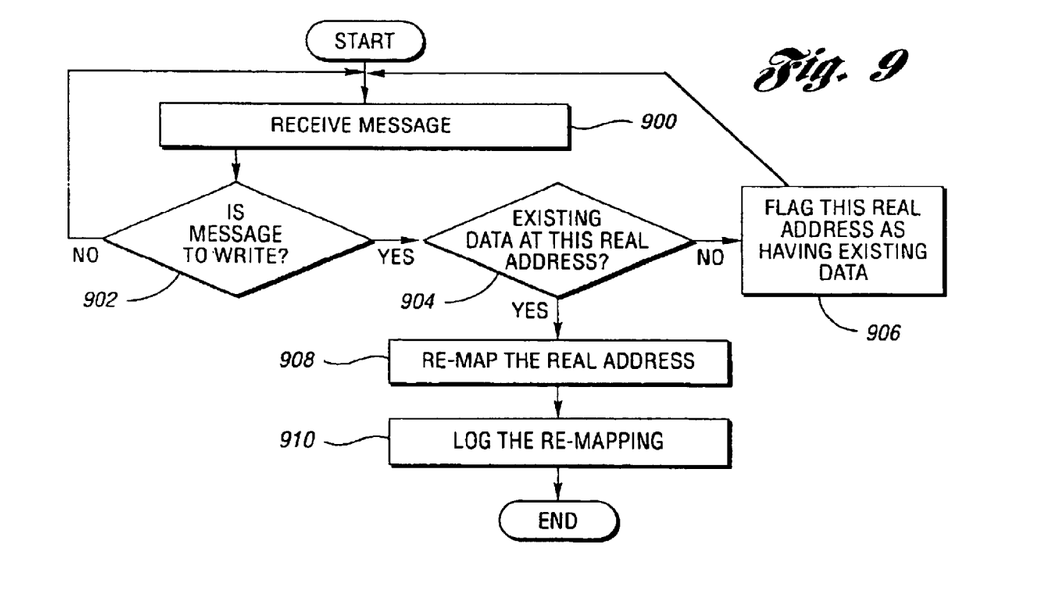
FIG. 9 is a flow diagram for a method of protecting existing data from being overwritten.

An optional function that can be provided by the interface manager 102 is an overwrite protection feature that protects existing data from being overwritten with new data having the same block address. Referring to FIG. 9, an overwrite controller 128 examines each message received by the client controller 118 from the client 90 for write messages, as shown in blocks 900 and 902. If the message is not an attempt to write data, then the NO branch of decision block 902 returns to the beginning to wait for the next message from the client 90. When a write message is received, the overwrite controller 128 checks the real block address within the write message to see if the real block address has ever been written to before, as shown by decision block 904. If this message is the first attempt to write to that real block address, the NO branch of decision block 904, then the overwrite controller 128 flags that real block address as having existing data, shown by block 906. Where the message is a second attempt to write to the real block address, the YES branch of decision block 904, then the address map 124 function is commanded to re-map the real block address to a new and unused virtual block address, as shown in block 908. This re-mapping preserves the existing data written earlier at the real block address. Finally, the re-mapping event may be recorded in a log file 130, as shown in block 910, to preserve the traceability back to the existing data.

The overwrite controller 128 can cause the emulated tape cartridge 110 to have more data than can be addressed by the client 90 using the interface protocol. Either a change must be made in the SCSI-2 standard to allow the client 90 to address the older data somehow, or a second interface protocol having a larger address range must be used to permit the client 90 to address all versions of the data. An example of a change to the SCSI-2 standard would be to define 8 reserved bits in the read message as a version byte. A value of 00 hex is interpreted as a read of the most recent data written at the real block address. A value of 01 hex is interpreted as a read of the second most recent old data written to the real block address. A value of 02 hex is interpreted as a read of the third most recent old data written to the read block address, and so on. The proper virtual address and virtual volume 114 of each version of the old data are available in the log file 130. Another example would be to use two logical unit numbers to address each emulated tape cartridge 110. One logical unit number could be used to address the emulated tape cartridge 110 as before, while the second logical unit number could be used to control access to versions of the data. Here, the address or a portion of the address associated with the second logical unit number defines the version of the data being read at the real block address associated with the first logical unit number.

It is apparent that in environments where address blocks are regularly overwritten, the log file 130 may become very large. Referring back to FIG. 6, the log file 130a is shown located within the interface manager 102. In an alternative embodiment, the log file 130b, shown in phantom, may be physically stored in one storage appliance 108 where the storage capacity is greater. The log file 130b may be written on one of the virtual volumes 114 or another storage volume of suitable size.

To accommodate a variety of clients 90a–c and a variety of storage appliances 108, the interface controller may be required to communicate to the data appliances using a second interface protocol. This condition is accounted for in the present invention by the inclusion of a protocol converter 131 function between the client controller 118 and the storage appliance controller 120. The protocol converter 131 function must operate bidirectionally. Interface protocol messages received from the clients 90a–c must be converted to second interface protocol messages communicated to the storage appliances 108. Likewise, second interface protocol messages received from the storage appliances 108 must be converted into interface protocol messages communicated to the clients 90a–c. In some cases, conversion may be as simple as converting between 8 bit wide data bytes used in the original (narrow) SCSI-2 standard and 16 bit wide data words used in the wide SCSI-2 standard. In other cases, conversion may require a translation between two completely different interface protocol standards.

Another feature that the interface manager 102 may provide is an ability to implement policies that control performance parameters of the emulated tape drive 112 and emulated tape cartridge 110. A policy controller 132, as shown in FIG. 6, in communication with the storage appliance controller 120 can dictate operations of the storage appliances 108. For example, access may be controlled to allow only certain nodes of the FC-AL fabric 92 (clients) to read and write to the emulated tape cartridge 110. Other nodes (clients) may have read-only privileges. Total capacity of the emulated tape cartridge 110 may be varied from client to client as required to minimize storage costs to the various clients 90a–c. Allocation of the virtual volumes 114 to different types of storage appliances 108 may be managed so that clients 90a–c requiring high bandwidth data transfers are allocated to faster storage appliances 108. Clients 90a–c requiring reliable data storage may be allocated to RAID 3 and RAID 5 type storage appliances 108. Other clients 90a–c may have data automatically migrated from expensive storage appliances 108 to less expensive storage appliances 108 in accordance with an aging algorithm. A variety of policies beyond those listed above may be implemented by the present invention to control one or more of the performance parameters.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system that emulates a tape cartridge mounted in a tape drive, the system comprising:

at least one storage appliance operative to emulate the tape drive and a plurality of virtual volumes mountable in the tape drive;

an interface manager in communication with the at least one storage appliance and in communication with the client using an interface protocol that defines a plurality of addresses, the interface manager being operative to control mounting of the plurality of virtual volumes in the tape drive to emulate the tape cartridge mounted in the tape drive, wherein the tape cartridge has a plurality of virtual addresses at least as great in number as the plurality of addresses defined by the interface protocol, wherein the interface manager comprises:

a client controller in communication with the client using the interface protocol; and a storage appliance controller in communication with the client controller and the at least one storage appliance, the storage appliance controller being operative to control mounting of the plurality of virtual volumes in the tape drive to emulate the tape cartridge mounted in the tape drive; and a policy controller in communication with the storage appliance controller, the policy controller being operative to control at least one performance parameter of the tape drive and the tape cartridge being emulated to provide variable levels of service to the client.

2. A system that emulates a tape cartridge mounted in a tape drive, the system comprising:

at least one storage appliance operative to emulate the tape drive and a plurality of virtual volumes mountable in the tape drive;

an interface manager in communication with the at least one storage appliance and in communication with the client using an interface protocol that defines a plurality of addresses, the interface manager being operative to control mounting of the plurality of virtual volumes in the tape drive to emulate the tape cartridge mounted in the tape drive, wherein the tape cartridge has a plurality of virtual addresses at least as great in number as the plurality of addresses defined by the interface protocol, and wherein the interface manager comprises:

a client controller in communication with the client using the interface protocol;

a storage appliance controller in communication with the client controller and the at least one storage appliance, the storage appliance controller being operative to control mounting of the plurality of virtual volumes in the tape drive to emulate the tape cartridge mounted in the tape drive; and an address map in communication with the client controller and the storage appliance controller, the address map being operative to map the plurality of addresses defined by the interface protocol into the plurality of virtual addresses of the tape cartridge, wherein the plurality of virtual addresses exceed in number the plurality of addresses defined by the interface protocol, the interface manager further comprising an overwrite controller in communication with the address map and the client controller, the overwrite controller being responsive upon receiving a write message having a selected address of the plurality of addresses, while the tape cartridge already stores existing data at the selected address, to re-map the selected address to a virtual address of the plurality of virtual addresses unmapped to any of the plurality of addresses, to preserve the existing data.

3. The system of claim 1 wherein the interface manager further comprises a log file in communication with the overwrite controller to record re-mapping operations to provide traceability back to the existing data for each re-mapped address of the plurality of addresses.

4. The system of claim 1 wherein the at least one storage appliance communicates using a second interface protocol, the interface manager further comprises a protocol converter in communication between the client controller and the storage appliance controller to convert between the interface protocol and the second interface protocol.

5. The system of claim 1 wherein the interface manager further comprises a policy controller in communication with the storage appliance controller, the policy controller being operative to control at least one performance parameter of the tape drive and the tape cartridge being emulated to provide variable levels of service to the client.

6. The system of claim 1 wherein the at least one storage appliance emulates the tape drive using an actual tape drive.

7. The system of claim 1 wherein the at least one storage appliance emulates the plurality of virtual volumes using at least one actual tape cartridge.

8. A method of operation comprising:

emulating a tape drive having an interface protocol that defines a plurality of addresses;

emulating a plurality of virtual volumes mountable in the tape drive to provide storage capacity;

mounting the plurality of virtual volumes one at a time in the tape drive to emulate a tape cartridge mounted in the tape drive, wherein the tape cartridge has a plurality of virtual addresses at least as great in number as the plurality of addresses defined in the interface protocol in response to emulating the plurality of virtual volumes;

mapping the plurality of addresses defined by the interface protocol into the plurality of virtual addresses respectively to link each address of the plurality of addresses to a respective one of the virtual addresses of the plurality of virtual addresses;

determining a first virtual volume of the plurality of virtual volumes associated with a first virtual address of the plurality of virtual addresses that is mapped to a selected address of the plurality of addresses in response to receiving the selected address from the client, to identify which part of the tape cartridge is being addressed by the client;

mounting the first virtual volume of the plurality of virtual volumes in response to determining the first virtual volume associated with the first virtual address, to make the tape cartridge accessible to the client at the selected address, wherein the plurality of virtual addresses exceeds in number the plurality of addresses defined the interface protocol; and re-mapping the selected address to a virtual address of the plurality of virtual addresses unmapped to any of the plurality of addresses in response to receiving a write message having the selected address while the tape cartridge already stores existing data at the selected address, to preserve the existing data.

9. The method of claim 8 further comprising logging the re-mapping of the selected address in response re-mapping the selected address to provide traceability back to the existing data for each re-mapped address.

10. The method of claim 8 wherein the emulation of the tape drive and the plurality of virtual volumes is performed by at least one storage appliance that communicates using a second interface protocol, the method further comprising translating between the interface protocol and the second interface protocol to isolate the second protocol from the client.

11. The method of claim 8 further comprising controlling at least one performance parameter of the tape drive and tape cartridge being emulated to provide variable levels of service to the client.

12. The method of claim 8 wherein emulating the tape drive is providing an actual tape drive.

13. The method of claim 8 wherein emulating the plurality of virtual volumes is providing at least one actual tape cartridge.

* * * * *